United States Patent
Mackey et al.

(10) Patent No.: US 9,915,222 B2
(45) Date of Patent: Mar. 13, 2018

(54) DIESEL PISTON WITH SEMI-HEMISPHERICAL CROWN

(71) Applicant: Cummins Inc., Columbus, IN (US)

(72) Inventors: Jason W. Mackey, Columbus, IN (US); David M. Barnes, Columbus, IN (US)

(73) Assignee: Cummins Inc., Columbus, IN (US)

( * ) Notice: Subject to any disclaimer, the term of this patent is extended or adjusted under 35 U.S.C. 154(b) by 350 days.

(21) Appl. No.: 14/666,489

(22) Filed: Mar. 24, 2015

(65) Prior Publication Data

US 2015/0275820 A1   Oct. 1, 2015

Related U.S. Application Data

(60) Provisional application No. 61/970,606, filed on Mar. 26, 2014.

(51) Int. Cl.
| | |
|---|---|
| *F01P 1/04* | (2006.01) |
| *F02F 3/00* | (2006.01) |
| *F02B 3/06* | (2006.01) |
| *F02B 23/06* | (2006.01) |
| *F02M 61/14* | (2006.01) |

(52) U.S. Cl.
CPC .......... *F02F 3/003* (2013.01); *F02B 23/0672* (2013.01); *F02B 23/0675* (2013.01); *F02B 3/06* (2013.01); *F02B 23/0657* (2013.01); *F02F 2003/0061* (2013.01); *F02M 61/14* (2013.01); *Y02T 10/125* (2013.01)

(58) Field of Classification Search
CPC .............. F02F 3/003; F02F 2003/0061; F02B 23/0675; F02B 23/0672; F02B 23/0657; F02B 3/06; Y02T 10/125

USPC .......... 123/445, 193.5, 193.6, 671, 664–666, 123/90.27

See application file for complete search history.

(56) References Cited

U.S. PATENT DOCUMENTS

| | | | |
|---|---|---|---|
| 2,644,433 A | | 7/1953 | Anderson |
| 4,060,059 A | * | 11/1977 | Blaser ...................... F02B 17/00 123/193.6 |
| 4,129,101 A | * | 12/1978 | Townsend ................. F01P 1/00 123/193.3 |
| 4,162,661 A | * | 7/1979 | Nakanishi ............... F02B 23/08 123/193.6 |
| 4,324,214 A | * | 4/1982 | Garcea .................... F02B 23/08 123/193.6 |
| 4,333,426 A | * | 6/1982 | Gavasso ................... F01L 1/12 123/666 |

(Continued)

FOREIGN PATENT DOCUMENTS

JP          10-317974          12/1998

*Primary Examiner* — Marguerite McMahon
(74) *Attorney, Agent, or Firm* — Faegre Baker Daniels LLP

(57) ABSTRACT

A diesel engine includes a cylinder block having a cylinder cavity defined therein. A cylinder head is coupled to the cylinder block and includes a lower semi-hemispherical surface defined thereon that defines an upper boundary of a combustion chamber. The engine includes a piston slideably disposed within the cylinder cavity that includes a piston crown having an upper surface configured to define a first portion of a lower boundary of the combustion chamber. The upper surface of the piston crown includes an axi-symmetric semi-hemispherical shape configured to correspond to the lower semi-hemispherical surface of the cylinder head.

20 Claims, 4 Drawing Sheets

(56) References Cited

U.S. PATENT DOCUMENTS

| | | | | |
|---|---|---|---|---|
| 4,532,896 A | * | 8/1985 | Nakahara | F02B 75/08 123/193.5 |
| 4,576,126 A | * | 3/1986 | Ancheta | F01M 1/02 123/193.6 |
| 4,669,431 A | * | 6/1987 | Simay | F02B 23/08 123/193.6 |
| 4,759,323 A | | 7/1988 | August | |
| 5,285,755 A | * | 2/1994 | Regueiro | F01L 1/26 123/193.6 |
| 5,309,879 A | * | 5/1994 | Regueiro | F02B 19/14 123/193.6 |
| 5,392,744 A | * | 2/1995 | Regueiro | F02B 19/18 123/262 |
| 5,427,065 A | * | 6/1995 | Kinoshita | F01L 1/053 123/308 |
| 5,714,688 A | | 2/1998 | Buttram et al. | |
| 5,727,535 A | | 3/1998 | Wallace | |
| 5,826,567 A | | 10/1998 | Sakaguchi et al. | |
| 6,158,409 A | * | 12/2000 | Gillespie | F02B 19/04 123/193.6 |
| 6,199,544 B1 | | 3/2001 | Feuling | |
| 6,354,260 B1 | * | 3/2002 | Newsom | F02F 1/242 123/193.5 |
| 6,407,702 B1 | * | 6/2002 | Bergman | G01S 3/143 342/364 |
| 6,497,151 B1 | | 12/2002 | Watts et al. | |
| 6,499,457 B2 | | 12/2002 | Suzuki et al. | |
| 6,508,226 B2 | | 1/2003 | Tanaka et al. | |
| 6,668,785 B1 | * | 12/2003 | Coates | F02F 3/28 123/193.6 |
| 7,040,279 B2 | | 5/2006 | Regueiro | |
| 7,341,053 B2 | * | 3/2008 | Kitada | F02B 23/101 123/193.3 |
| 7,719,266 B1 | | 5/2010 | Zamanzadeh et al. | |
| 2003/0159665 A1 | * | 8/2003 | Coney | F02B 25/14 123/65 VD |
| 2006/0169257 A1 | | 8/2006 | Ziehl | |
| 2007/0056556 A1 | * | 3/2007 | Yohso | F02B 23/08 123/308 |
| 2011/0114059 A1 | * | 5/2011 | Plazas Torres | F02B 23/0645 123/305 |
| 2012/0174899 A1 | * | 7/2012 | Haug | C22C 38/02 123/668 |

\* cited by examiner

DIESEL PISTON WITH SEMI-HEMISPHERICAL CROWN

PRIORITY CLAIM

This application claims priority to U.S. provisional application Ser. No. 61/970,606 filed on Mar. 26, 2014, the entire disclosure of which is expressly incorporated herein by reference.

FIELD OF THE DISCLOSURE

The present disclosure relates to pistons for use in diesel engines such as, for example, diesel engines having dual-overhead cam (DOHC) valvetrains and high-pressure common rail (HPCR) fuel injectors.

BACKGROUND

For some diesel engine applications, the use of a switching type-1 (direct acting cam on bucket tappet) DOHC valvetrain is desired as a high speed valvetrain with variable swirl capabilities (e.g., via tappet switching). In embodiments, to fit the DOHC configuration with a centered, vertical HPCR fuel injector, the engine valves may be splayed. In some conventional diesel engines, the combustion chamber is defined almost entirely within a piston bowl defined in the piston. As a result, splaying the engine valves can create a volume of dead space at each in-cylinder engine valve seat. The dead space associated with intake valves may shroud the incoming intake charge, diminishing cylinder filling efficiency; and the dead space associated with the exhaust valves may shroud the exhaust gas, diminishing cylinder emptying efficiency. To mitigate the effects of the resulting shrouding, many diesel engines include a cylinder head having a semi-hemispherical lower surface, which may facilitate a lower pressure drop across the engine valves and better engine breathing (i.e., higher volumetric efficiency).

To facilitate various squish characteristics, the prior art includes a number of piston designs that incorporate a dome-shaped crown and a number of cavities or pockets defining the combustion chamber. For example, U.S. Pat. No. 2,644,433, to Anderson, discloses a combustion chamber defined by twin diametrically opposed cavities defined in a piston crown, which is domed-shaped to correspond to a spherical recess in the bottom face of the cylinder head. U.S. Pat. No. 5,285,755, to Regueiro, discloses a piston head that may be dome-shaped to correspond to a pentroof angle of the fire deck of the cylinder head and that includes four recessed lobes in its top surface. In further advances, axi-symmetric piston bowls having flat upper surfaces were designed to mitigate production of unwanted particulates and excesses of unburned hydrocarbons. For example, U.S. Pat. No. 8,276,563, to Quigley et al., discloses a piston having a flat upper surface and an axi-symmetric combustion bowl with a substantially circular shape. U.S. Publication No. 2012/0234285 discloses a piston bowl having a flat upper surface, an axi-symmetric combustion bowl, and a number of valve pockets arranged about the periphery of the piston crown.

Previously, manufacturers of diesel engines have steered away from pistons having semi-hemispherical crowns and axi-symmetric combustion bowls because it was believed that this shape would be conducive to excess unburned hydrocarbons and creation of excessive particulate matter. The inventors of the present disclosure have discovered that embodiments of the design described herein do not result in excess unburned hydrocarbons and creation of excessive particulate matter.

SUMMARY

Embodiments of the present disclosure utilize a combustion chamber formed by a piston having a piston crown that includes an axi-symmetric semi-hemispherical upper surface configured to correspond to a semi-hemispherical lower surface portion of the cylinder head. In embodiments, the semi-hemispherical piston crown may facilitate minimization of dead space around the valve seats, and thereby enable combustion efficiency in engines having high-speed valvetrain configurations (e.g., switching type-1 DOHC valvetrains).

In particular, embodiments of the disclosure include a piston for a diesel engine, the piston including a piston crown and a piston skirt extending downward from the piston crown. The piston crown includes a piston bowl and an upper surface configured to define a portion of a lower boundary of a combustion chamber. The upper surface of the piston has an axi-symmetric semi-hemispherical shape.

Embodiments of the disclosure also include a diesel engine having a cylinder block with a cylinder cavity defined therein. The cylinder cavity extends downward from an opening defined in an upper surface of the cylinder block. The diesel engine also includes a cylinder head coupled to the cylinder block. The cylinder head includes a lower semi-hemispherical surface defined thereon, which defines an upper boundary of a combustion chamber. A piston is slideably disposed within the cylinder cavity, and includes a piston crown having an upper surface configured to define a first portion of a lower boundary of the combustion chamber. The upper surface includes an axi-symmetric semi-hemispherical shape. The piston crown also includes a piston bowl having a projection portion and a piston bowl floor, where the projection portion and the piston bowl floor define a second portion of the lower boundary of the combustion chamber.

Embodiments of the disclosure also include a diesel engine having a cylinder block including a cylinder cavity defined therein. The cylinder cavity extends downward from an opening defined in an upper surface of the cylinder block. A cylinder head is coupled to the cylinder block and includes a lower semi-hemispherical surface defined thereon. The lower semi-hemispherical surface defines an upper boundary of a combustion chamber. The engine also includes a piston slideably disposed within the cylinder cavity. The piston includes a piston crown having an upper surface configured to define a first portion of a lower boundary of the combustion chamber. The upper surface of the piston includes an axi-symmetric semi-hemispherical shape configured to correspond to the lower semi-hemispherical surface of the cylinder head. The piston also includes a piston bowl having a projection portion and a piston bowl floor, where the projection portion and the piston bowl floor define a second portion of the lower boundary of the combustion chamber.

Figure 1:
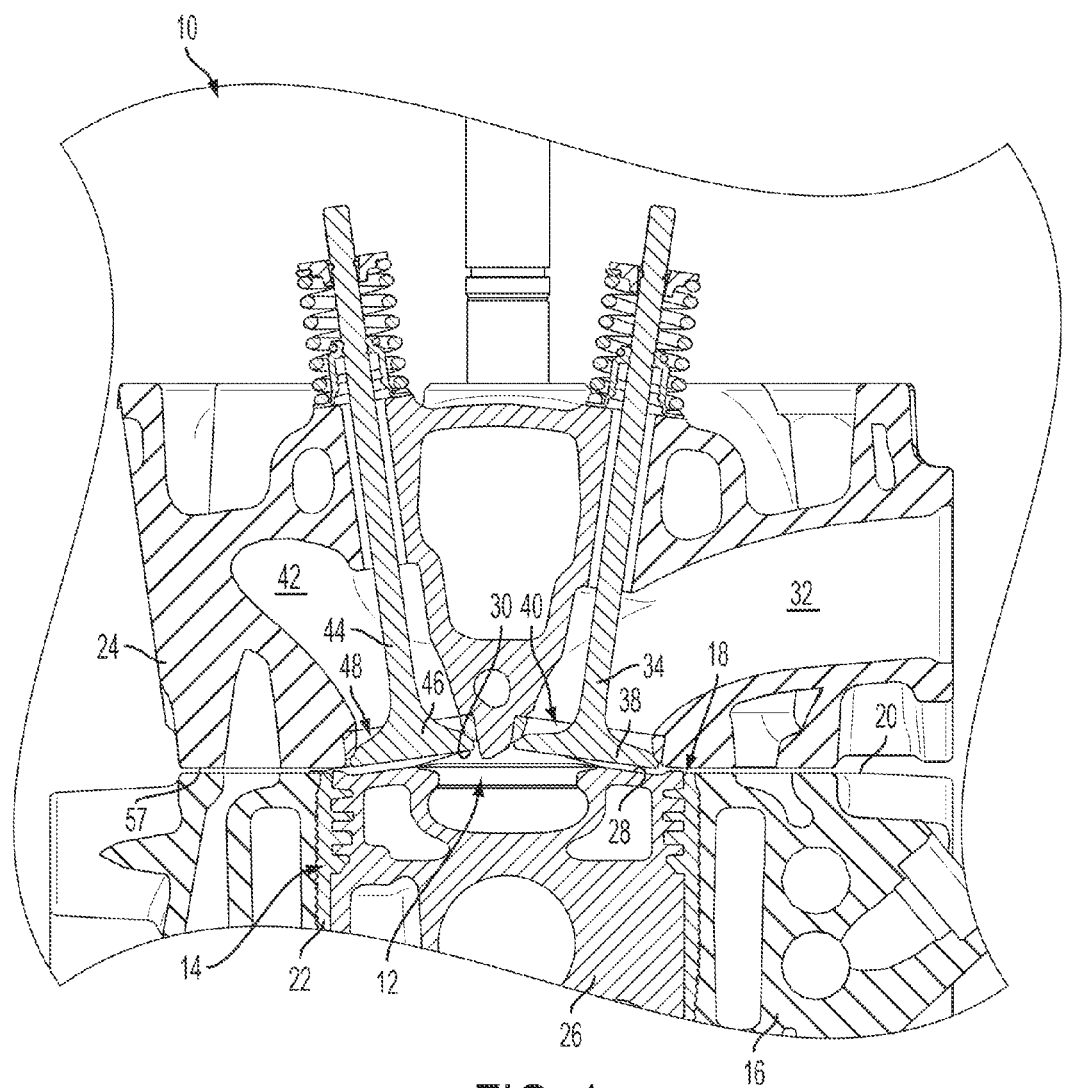
FIG. 1 is a cross-sectional view of a portion of a diesel engine, taken through the center of a set of engine valves and perpendicular to the crankshaft axis, in accordance with embodiments of the present disclosure.

While the present disclosure is amenable to various modifications and alternative forms, specific embodiments have been shown by way of example in the drawings and are described in detail below. The present disclosure, however, is not limited to the particular embodiments described. On the contrary, the present disclosure is intended to cover all modifications, equivalents, and alternatives falling within the ambit of the present disclosure as defined by the appended claims.

DETAILED DESCRIPTION

Cylinder heads in conventional diesel engines often have a substantially flat lower surface and the combustion chamber typically is defined almost entirely within a piston bowl defined in the piston. As a result, splaying the engine valves can create a volume of dead space at each in-cylinder engine valve seat. To mitigate the effects of the resulting shrouding, embodiments of the disclosure utilize a cylinder head having a semi-hemispherical lower surface. As a result, embodiments of the disclosure may facilitate a lower pressure drop across the engine valves and better engine breathing (i.e., higher volumetric efficiency). Additionally, embodiments of the disclosure include a piston having a crown that includes a semi-hemispherical shape configured to correspond to (e.g., mimic) the semi-hemispherical lower surface of the cylinder head. In this manner, embodiments of the disclosure may facilitate limiting dead space volumes around the valve seats, which may facilitate limiting excessive unburned hydrocarbons and creation of particulate matter.

Figure 2:
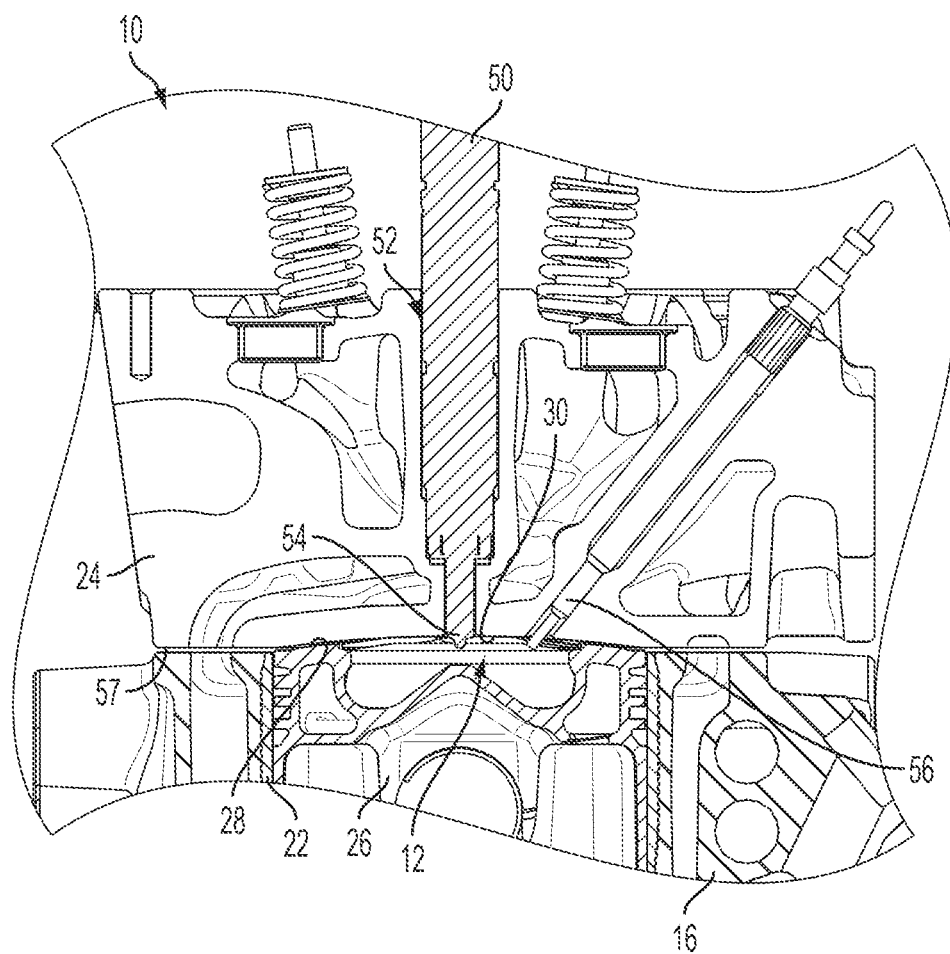
FIG. 2 is another cross-sectional view of a portion of the diesel engine depicted in FIG. 1, taken through the center of a cylinder cavity and perpendicular to the crankshaft axis, in accordance with embodiments of the present disclosure.

With reference to FIG. 1, there is illustrated a portion of a compression ignition (diesel) internal combustion engine 10. The internal combustion engine 10 includes at least one combustion chamber 12. In embodiments, the engine 10 may contain a plurality of combustion chambers 12, for example four, six, or eight, which may be arranged in a line or in a "V" configuration. Each combustion chamber 12 is formed at one end of a cylinder cavity 14, which is defined within a cylinder block 16. The cylinder cavity 14, which extends downward from an opening 18 defined in an upper surface 20 of the cylinder block 16, may be adapted to receive a removable cylinder liner 22. The engine 10 also includes a cylinder head 24 that attaches to the cylinder block 16 to close the cylinder cavity 14. The engine 10 further includes a piston 26 positioned for reciprocal movement within the cylinder cavity 14. Although only a top portion of the piston 26 is shown in FIGS. 1 and 2, the piston 26 may be of any type of piston containing embodiments of features identified herein for accomplishing aspects of the present disclosure. For example, the piston 26 may be an articulated piston or a single piece piston.

An upper surface 28 of the piston 26 defines a portion of a lower boundary of the combustion chamber 12, and a lower semi-hemispherical surface 30 of the cylinder head 24 defines an upper boundary of the combustion chamber 12. Although not specifically illustrated, the piston 26 connects to a crankshaft of the engine 10 by way of a connecting rod that causes the piston 26 to reciprocate along a rectilinear path within the cylinder cavity 14 (and cylinder liner 22) as the engine crankshaft rotates. FIG. 1 illustrates the position of the piston 26 in a top-dead-center (TDC) position achieved when the crankshaft is positioned to move the piston 26 to the furthest most position away from the rotational axis of the crankshaft. In a conventional manner, the piston 26 moves from the TDC position to a bottom-dead-center (BDC) position when advancing through the intake and power strokes.

The engine 10 of embodiments of the present disclosure may be a four-cycle compression ignition (diesel) engine employing direct injection of fuel into each combustion chamber 12. An intake port 32 formed in the cylinder head 24 selectively directs intake air into the combustion chamber 12 by means of a pair of intake valves 34 positioned in the cylinder head 24, only one of which is illustrated in FIG. 1. As illustrated the intake valve 34 includes a valve head 38 configured to be engaged in a valve seat 40 when the intake valve 34 is closed. Similarly, an exhaust port 42 formed in the cylinder head 24 selectively directs exhaust gas from the combustion chamber 12 by means of a pair of exhaust valves 44 positioned in the cylinder head 20, only one of which is illustrated in FIG. 1. The exhaust valve 44 includes a valve head 46 configured to be engaged in a valve seat 48 when the exhaust valve 44 is closed. The opening and closing of valves 34 and 44 may be achieved by a mechanical cam or hydraulic actuation system (not shown) or other motive system.

As shown in FIG. 2, the engine 10 also includes a fuel injector 50, mounted in an injector bore 52 formed in the cylinder head 24, for injecting fuel at high pressure into the combustion chamber 12 when the piston 26 is approaching, at, or moving away from, the TDC position. In embodiments, the fuel injector 50 may be oriented vertically, as shown in FIG. 2. The fuel injector 50 includes, at its lower end, an injector nozzle assembly 54 having a plurality of injection orifices (not illustrated), formed in the lower end of the nozzle assembly 54, for permitting high-pressure fuel to flow into the combustion chamber 12 at a high pressure to induce thorough mixing of the fuel with the high temperature, compressed charge air within the combustion chamber 12. The fuel injector 50 may be any type of fuel injector capable of injecting high-pressure fuel into the combustion chamber 12. As shown in FIG. 2, the internal combustion engine 10 also includes a glow plug 56 that may be configured to provide cold-starting ignition assistance.

As shown in FIGS. 1 and 2, the lower surface 57 of the cylinder head 24 includes a semi-hemispherical concave "dome-shaped" surface 30 that facilitates un-shrouding of the valves 34 and 44 for enhanced cylinder filling and emptying efficiency. According to various embodiments of the present disclosure, the upper surface 28 of the piston 26 is configured to mimic, and thus correspond to, this semi-hemispherical dome-shaped lower surface 30 of the cylinder head 24.

Figure 3:
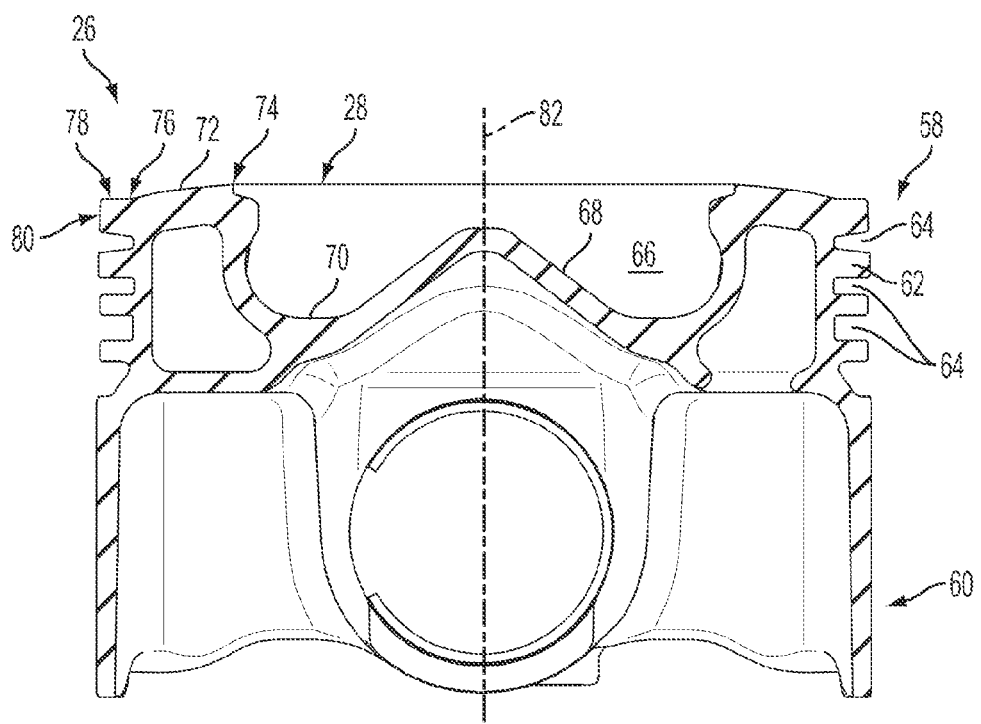
FIG. 3 is a cross-sectional side view of a piston in accordance with embodiments of the present disclosure.
Figure 4:
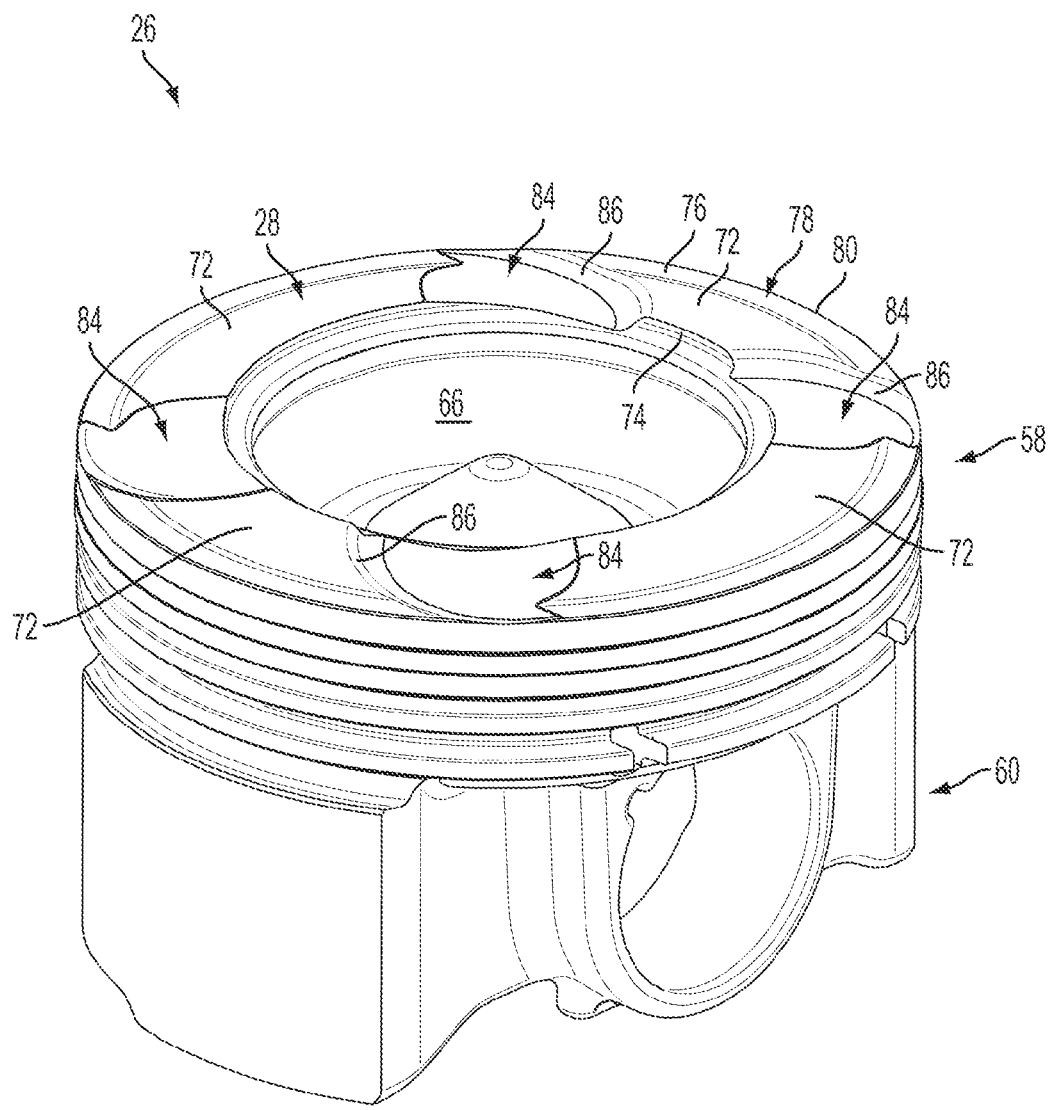
FIG. 4 is a perspective view of the piston depicted in FIG. 3 in accordance with embodiments of the present disclosure.

FIGS. 3 and 4 illustrate the piston 26 depicted in FIGS. 1 and 2, in accordance with embodiments of the present disclosure. In embodiments, the piston 26 may be an integral metallic structure formed of a heat resistant alloy. Embodiments of the present disclosure also contemplate that the piston 26 could be of a variety of other styles including, but not limited to, an articulated piston, monobloc piston, forged piston, multi-piece piston, and other configurations known to those of skill in the art. The piston 26 may be formed of a metallic, intermetallic, ceramic, and/or composite material that may, for example, be selected to withstand various anticipated temperatures and pressures associated with an internal combustion engine combustion chamber. For example, in embodiments, the piston 26 may be a two-piece, induction-welded steel piston.

As shown in FIGS. 3 and 4, the illustrated piston 26 includes a piston crown 58 and a piston skirt 60 extending downward from the piston crown 58. The piston crown 58, which includes the upper surface 28 of the piston 26, includes a depending cylindrical wall 62 including a plurality of peripherally opening, annular grooves 64 for receiving corresponding piston rings or seals (not illustrated) designed to form a combustion gas seal between the piston 26 and the surrounding wall of the cylinder liner 22 (shown in FIGS. 1 and 2). The piston crown 58 includes an upper surface 28 that defines a first portion of a lower boundary of the combustion chamber 12, and a piston bowl 66 formed by an upwardly opening cavity. The piston bowl 66 includes an upwardly projecting portion 68, which may be positioned at or near the center of the piston bowl 66, and a piston bowl floor 70. Together, the projecting portion 68 and the piston bowl floor 70 define a second portion of the lower boundary of the combustion chamber 12. Various configurations for the piston bowl 66 are contemplated herein and may include, for example, a shape such as that described in U.S. Patent Publication No. 2012/0234285, to Venugopal et al, assigned to Cummins Intellectual Property, Inc., of Minneapolis, Minn.; U.S. Pat. No. 5,868,112, to Mahakul et al, assigned to Cummins Engine Company, Inc., of Columbus, Ind.; and/or U.S. Pat. No. 8,276,563 to Quigley et al., assigned to Cummins, Inc., of Columbus, Ind.; the entirety of each of which is expressly incorporated herein by reference.

As illustrated in FIGS. 3 and 4, the upper surface 28 of the piston 26 includes an uppermost surface portion 72 that slopes downward from an inner edge 74 to an outer position 76 and about the periphery of the piston 26. The design of the uppermost surface portion 72 provides an overall axi-symmetrical semi-hemispherical convex shape to the crown 58 of the piston 26. In embodiments, the convex curvature of the uppermost surface portion 72 is configured to correspond to the concave curvature of the semi-hemispherical lower surface 30 of the cylinder head 24. Additionally, in embodiments, the uppermost surface portion 72 is configured such that, in a TDC position, the inner edge 74 of the uppermost surface portion 72 is positioned beyond (i.e., above) a plane corresponding to the upper surface 20 of the cylinder block 16.

The upper surface 28 of the piston 26 may also include an outer periphery portion 78, extending from the outer position 76 to a peripheral edge 80, which is positioned at a junction of the cylindrical wall 62 and the upper surface 28 of the piston 26. The outer periphery portion 78 may be, for example, oriented perpendicularly (or at least substantially perpendicularly, e.g., within 5 or 10 degrees) to a central axis 82 of the piston 26. The upper surface 28 of the piston 26 may, in embodiments, also include a number of valve pockets 84, as shown in FIG. 4. Each valve pocket 84 may extend inwardly from the peripheral edge 80. The valve pockets 84 may separate the uppermost surface portion 72 into a number of raised islands or platforms, as illustrated in FIG. 4. About the periphery of each valve pocket 84 may be a rolled or beveled edge 86. In embodiments, the features of the piston bowl 66 axially inward from the surface of the valve pockets 84 are concentric with the central axis 82 of the piston 26, which is also the central axis 82 of the piston bowl 66. These features may also be described as annular about the central axis 82 of the piston 26. Because of the annular nature of the features of the piston bowl 66 inward from the surface of the valve pockets 84, the piston bowl 66 is axi-symmetric about the central axis 82 of the piston 26 at all locations in the piston bowl 66 that are axially inward from the surface of the valve pockets 84. In embodiments, the piston 26 includes four valve pockets 84 positioned in the piston crown 58 and these four valve pockets 84 may be uniformly spaced about the top of the piston crown 58. Thus, in embodiments, the piston crown 58 is axi-symmetric about any axial plane that includes the central axis 82 of the piston 26.

While embodiments of the present disclosure are described with specificity, the description itself is not intended to limit the scope of this patent. Thus, the inventors have contemplated that the claimed invention might also be embodied in other ways, to include different features, or combinations of features, similar to the ones described in this document, in conjunction with other technologies.

The following is claimed:

1. A piston for a diesel engine, the piston comprising:
a piston crown including a piston bowl and an upper surface that define a portion of a lower boundary of a combustion chamber, wherein the upper surface comprises an axi-symmetric semi-hemispherical shape and an outer periphery portion extending from an outer position of the axi-symmetric semi-hemispherical shape to a peripheral edge of the piston crown, wherein the outer periphery portion is oriented substantially perpendicular to a central axis of the piston.

2. The piston of claim 1, wherein the upper surface corresponds to a shape of a lower semi-hemispherical surface of a cylinder head, wherein the lower semi-hemispherical surface of the cylinder head forms an upper boundary of the combustion chamber.

3. The piston of claim 1, wherein the upper surface comprises an uppermost surface portion that slopes downward from an inner edge to an outer position along a periphery of the piston crown.

4. The piston of claim 1, wherein, in a top-dead-center position, an inner edge of the uppermost surface portion is positioned beyond a plane corresponding to an upper surface of a cylinder block having a cylinder cavity defined therein, wherein the piston is slideably received within the cylinder cavity.

5. The piston of claim 1, wherein the piston comprises a two-piece, induction-welded steel piston.

6. A diesel engine comprising:
a cylinder block including a cylinder cavity defined therein, the cylinder cavity extending downward from an opening defined in an upper surface of the cylinder block;
a cylinder head coupled to the cylinder block, wherein the cylinder head comprises a lower semi-hemispherical surface defined thereon, wherein the lower semi-hemispherical surface defines an upper boundary of a combustion chamber; and
a piston slideably disposed within the cylinder cavity, the piston comprising a piston crown that includes:
an upper surface that defines a portion of a lower boundary of the combustion chamber, wherein the upper surface comprises an axi-symmetric semi-hemispherical shape and an outer periphery portion extending from an outer position of the axi-symmetric semi-hemispherical shape to a peripheral edge of the piston crown wherein the outer periphery portion is oriented substantially perpendicular to a central axis of the piston.

7. The diesel engine of claim 6, wherein the upper surface corresponds to a shape of the lower semi-hemispherical surface of the cylinder head.

8. The diesel engine of claim 6, wherein the upper surface comprises an uppermost surface portion of the piston that slopes downward from an inner edge to an outer position along the periphery of the piston crown.

9. The diesel engine of claim 6, wherein the upper surface further comprises a plurality of valve pockets that separate an uppermost surface portion of the piston into a plurality of raised platforms.

10. The diesel engine of claim 9, wherein the plurality of valve pockets comprises four valve pockets.

11. The diesel engine of claim 6, wherein, in a top-dead-center position, an inner edge of an uppermost surface portion of the piston is positioned above a plane corresponding to the upper surface of the cylinder block.

12. The diesel engine of claim 6, wherein the piston comprises a two-piece, induction-welded steel piston.

13. The diesel engine of claim 6, further comprising a double-overhead cam (DOHC) valvetrain and a vertical high-pressure common rail (HPCR) fuel injector.

14. The diesel engine of claim 6, further comprising a plurality of splayed engine valves.

15. A diesel engine comprising:
   a cylinder block including a cylinder cavity defined therein, the cylinder cavity extending downward from an opening defined in an upper surface of the cylinder block;
   a cylinder head coupled to the cylinder block, wherein the cylinder head comprises a lower semi-hemispherical surface defined thereon, wherein the lower semi-hemispherical surface defines an upper boundary of a combustion chamber; and
   a piston slideably disposed within the cylinder cavity, the piston comprising a piston crown that includes:
   an upper surface that defines a portion of a lower boundary of the combustion chamber, wherein the upper surface comprises an axi-symmetric semi-hemispherical shape that corresponds to the lower semi-hemispherical surface of the cylinder head and an outer periphery portion extending from an outer position of the axi-symmetric semi-hemispherical shape to a peripheral edge of the piston crown wherein the outer periphery portion is oriented substantially perpendicular to a central axis of the piston.

16. The diesel engine of claim 15, wherein the upper surface comprises an uppermost surface portion that slopes downward from an inner edge to an outer position along the periphery of the piston crown.

17. The diesel engine of claim 15, wherein the upper surface comprises a plurality of valve pockets that separate an uppermost surface portion of the piston into a plurality of raised platforms.

18. The diesel engine of claim 15, wherein, in a top-dead-center-position, an inner edge of an uppermost surface portion of the piston is positioned above a plane corresponding to the upper surface of the cylinder block.

19. The diesel engine of claim 15, wherein the piston comprises a two-piece, induction-welded steel piston.

20. The diesel engine of claim 15, further comprising:
   a dual-overhead cam (DOHC) valvetrain; a vertical high-pressure common rail (HPCR) fuel injector; and a plurality of splayed engine valves.

* * * * *

UNITED STATES PATENT AND TRADEMARK OFFICE
CERTIFICATE OF CORRECTION

PATENT NO. : 9,915,222 B2
APPLICATION NO. : 14/666489
DATED : March 13, 2018
INVENTOR(S) : Jason W. Mackey et al.

Page 1 of 1

It is certified that error appears in the above-identified patent and that said Letters Patent is hereby corrected as shown below:

In the Specification

Column 1, Paragraph 2: At the end of the sentence insert --This invention was made with Government support under DE-EE0004125 awarded by DOE. The Government has certain rights in this invention.--

Signed and Sealed this
Thirteenth Day of August, 2019

Andrei Iancu
*Director of the United States Patent and Trademark Office*